US008948438B2

(12) United States Patent
Hatton et al.

(10) Patent No.: US 8,948,438 B2
(45) Date of Patent: Feb. 3, 2015

(54) SPEAKER CABINET POLE MOUNT AND SPEAKER CABINET

(75) Inventors: James Hatton, St. Leonards-on-Sea (GB); Roger Willems, Brede (GB)

(73) Assignee: Penn Elcom Limited, St. Leonards on Sea (GB)

( * ) Notice: Subject to any disclaimer, the term of this patent is extended or adjusted under 35 U.S.C. 154(b) by 0 days.

(21) Appl. No.: 13/480,105

(22) Filed: May 24, 2012

(65) Prior Publication Data

US 2013/0251188 A1  Sep. 26, 2013

(30) Foreign Application Priority Data

Mar. 22, 2012 (DE) ..................... 20 2012 002 973 U

(51) Int. Cl.
*H04R 1/02* (2006.01)

(52) U.S. Cl.
USPC ........... 381/390; 381/386; 381/387; 381/395; 381/87; 381/332; 403/361

(58) Field of Classification Search
CPC .......... H04R 1/02; H04R 1/021; H04R 1/025; H04R 1/026; H04R 1/323; H04R 1/403; H04R 5/02; H04R 2201/02; H04R 2201/021; H04R 2201/025; E04H 12/22; E04H 12/2253; E04H 12/2261; E04H 12/2269; E04H 12/2276
USPC ........... 381/390, 386, 87, 332, 387, 395, 362; 403/141, 165, 361; 248/527, 524, 248/218.4, 230.1, 224.7, 219.1, 219.2
See application file for complete search history.

(56) References Cited

U.S. PATENT DOCUMENTS

| 4,998,701 | A * | 3/1991 | Rawald ....................... 248/224.7 |
| 6,349,451 | B1 * | 2/2002 | Newman et al. ................. 16/427 |
| 7,412,069 | B2 * | 8/2008 | Workman et al. .............. 381/363 |
| 7,455,271 | B2 * | 11/2008 | Pincek et al. ............. 248/288.31 |
| 7,559,714 | B2 * | 7/2009 | Ruhlander ..................... 403/263 |
| 8,582,798 | B2 * | 11/2013 | Staley et al. .................. 381/387 |
| 2003/0174855 | A1 * | 9/2003 | Hawkins et al. .............. 381/386 |
| 2009/0206220 | A1 * | 8/2009 | Forrest et al. ................. 248/251 |
| 2011/0174570 | A1 * | 7/2011 | Freed et al. .................... 181/199 |

OTHER PUBLICATIONS

Ultimate Support Systems, "TSM-138MK: Mounting Bracket for Mounting Speaker Cabinets on Speaker Stands—1-3/8" <http://www.ultimatesupport.com/product/TSM-138MK>, retrieved Jan. 23, 2010 via Internet Archive.*

(Continued)

*Primary Examiner* — Curtis Kuntz
*Assistant Examiner* — Joshua A Kaufman
(74) *Attorney, Agent, or Firm* — Gordon & Jacobson, PC

(57) ABSTRACT

A speaker cabinet pole mount includes a socket body and an attachment element. The socket body defines a pole socket comprising a first socket part and a second socket part extending generally from one end of the first socket part. The first socket part has a first diameter and the second socket part having a second, smaller diameter. The second socket part has an internal wall which is provided with at least one coupling element adapted to engage with a threaded pole. The attachment element is coupled to the socket body generally at the other end of the first socket part, the attachment element being adapted for connection to a wall of a speaker cabinet.

7 Claims, 3 Drawing Sheets

(56) References Cited

OTHER PUBLICATIONS

Ultimate Support Systems, "BMB-200K: External Speaker Cabinet Mounting Bracket for Mounting Speaker Cabinets on Speaker Stands", <http://www.ultimatesupport.com/product/BMB-200K>, retrieved Jan. 23, 2010 via Internet Archive.*

Kustom, "Kustom KPC10 10" PA Speaker Cabinet with Horn Pair, <http://www.musiciansfriend.com/pro-audio/kustom-kpc10-10-pa-speaker-cabinet-with-horn-pair>, retrieved Oct. 2, 2011 via Internet Archive.*

* cited by examiner

000
SPEAKER CABINET POLE MOUNT AND SPEAKER CABINET

CROSS-REFERENCE TO RELATED APPLICATIONS

This application claims priority from German Utility Model Number 20 2012 002973.8, filed Mar. 22, 2012, herein incorporated by reference in its entirety.

BACKGROUND

1. Field of the Invention

The invention relates to a speaker cabinet pole mount.

2. Related Art

Speaker cabinets are often mounted on speaker stands, which are typically tripod stands having three legs and a vertical pole on which the speaker cabinet is mounted. Historically speaker stands have had a plain vertical pole, which is located into a complementarily shaped socket of a pole mount (known as a "top hat") provided in the bottom wall of the speaker cabinet. Recently however speaker stands having threaded poles (that is poles with a smaller diameter threaded rod provided at one end) have been introduced, along with top hats which are complimentarily internally threaded.

Musicians and DJs generally have their own speakers but entertainment venues often provide the speaker stands for the musicians/DJs to mount their speakers on during a performance at the venue. The introduction of speaker stands having threaded poles and speaker cabinets having internally threaded top hats has given rise to the problem that the speaker stands provided by a venue may not be of the same mounting type (i.e. threaded or unthreaded) as the musician's speaker cabinet. If this occurs the speaker cabinet cannot be mounted on the speaker stand provided by the venue, but must be placed on the floor or other flat surface, which may result in the performance being of a lower acoustic quality.

SUMMARY OF THE INVENTION

A first aspect of the invention provides a speaker cabinet pole mount comprising a socket body and an attachment element. The socket body defines a pole socket comprising a first socket part and a second socket part extending generally from one end of the first socket part. The first socket part has a first internal diameter. The second socket part has a second, smaller internal diameter and has an internal wall provided with at least one coupling element adapted to engage with a threaded pole. The attachment element is coupled to the socket body generally at the other end of the first socket part. The attachment element is adapted for connection to a wall of a speaker cabinet.

A speaker stand having a threaded pole may be located in the speaker cabinet pole mount by screwing a threaded end of the pole into the second socket part of the pole socket. A speaker stand having a plain, unthreaded pole may be located in the speaker cabinet pole mount by pushing an end of the pole into the first socket part of the pole socket. The smaller internal diameter of the second socket part may ensure that plain poles are constrained within the first socket part and only threaded poles may be engaged with the second socket part. The speaker cabinet pole mount may therefore be used to mount a speaker cabinet on each of a threaded pole and an unthreaded pole. The invention may therefore provide a universal speaker cabinet pole mount, which may remove the current requirement for a user to ensure that a speaker cabinet and a speaker stand pole have matching pole mount and end types. This may remove some constraints on speaker equipment usage and may free a user from worrying about whether their speaker cabinet has a pole mount of a matching type to the pole of a speaker stand which is to be provided by a third party, such as an entertainment venue.

In an embodiment, the first socket part has an internal wall which is unthreaded and at least part of the internal wall of the second socket part is provided with an internal thread. A plain speaker stand pole may be easily pushed into the first socket part and a speaker stand pole having a threaded end may be securely engaged with the second socket part, the engagement between the threads providing a strong mechanical coupling between the speaker cabinet pole mount and the pole.

In an embodiment, the socket body comprises a first part and a second part, the first part has a generally cylindrical shape and defines the first socket part and the second part has a generally cylindrical shaped and defines the second socket part. The socket body may therefore be easily located through an aperture in a wall of a speaker cabinet, so that the speaker body extends internally into the speaker cabinet. The shape of the socket body may minimize the size of the hole in the speaker cabinet wall and may minimize the amount of internal space occupied by the socket body.

In an embodiment, the first part has a first external diameter and the second part has a second, smaller external diameter and wherein the socket body further comprises a plurality of strengthening elements extending between an external wall of the second part and said one end of the first part. The size and amount of material required to form the pole mount may therefore be minimized while maintaining strength in the socket body.

In an embodiment, the attachment element comprises a collar which extends around at least part of the first part of the socket body. In an embodiment, the attachment element comprises a collar which extends fully around the first part of the socket body. An attachment element is therefore provided which may be located close against an external surface of the wall of the speaker cabinet through which the socket body is located.

In an embodiment, the internal wall of the first socket part has a plurality of elongate channels formed therein. The presence of the channels creates air gaps so that suction does not make it difficult to remove a pole from the pole mount.

A second aspect of the invention provides a speaker cabinet comprising a speaker cabinet pole mount. The speaker cabinet pole mount comprises a socket body and an attachment element. The socket body defines a pole socket comprising a first socket part and a second socket part extending generally from one end of the first socket part. The first socket part has a first internal diameter. The second socket part has a second, smaller internal diameter and has an internal wall provided with at least one coupling element adapted to engage with a threaded pole. The attachment element is coupled to the socket body generally at the other end of the first socket part. The attachment element is adapted for connection to a wall of a speaker cabinet.

A threaded pole may be located in the speaker cabinet pole mount by screwing a threaded end of the pole into the second socket part of the pole socket. A plain, unthreaded pole may be located in the speaker cabinet pole mount by pushing an end of the pole into the first socket part of the pole socket. The smaller internal diameter of the second socket part may ensure that plain poles are constrained within the first socket part and only threaded poles may be engaged with the second socket part. The speaker cabinet may therefore be coupled to each of a threaded pole and an unthreaded pole. The invention may therefore provide a speaker cabinet having a universal pole mount, which may remove the current requirement for a user to ensure that a speaker cabinet and a speaker stand pole have matching pole mount and end types. This may remove some constraints on speaker equipment usage and may free a user from worrying about whether their speaker cabinet has a pole mount of a matching type to the pole of a speaker stand which is to be provided by a third party, such as an entertainment venue.

In an embodiment, the first socket part has an internal wall which is unthreaded and at least part of the internal wall of the second socket part is provided with an internal thread. A plain speaker stand pole may be easily pushed into the first socket part and a speaker stand pole having a threaded end may be securely engaged with the second socket part, the engagement between the threads providing a strong mechanical coupling between the speaker cabinet pole mount and the pole.

In an embodiment, the socket body comprises a first part and a second part, the first part has a generally cylindrical shape and defines the first socket part and the second part has a generally cylindrical shaped and defines the second socket part. The socket body is located through an aperture in a wall of the speaker cabinet, so that the speaker body extends internally into the speaker cabinet. The shape of the socket body may minimize the size of the hole in the speaker cabinet wall and may minimize the amount of internal space occupied by the socket body.

In an embodiment, the first part has a first external diameter and the second part has a second, smaller external diameter and wherein the socket body further comprises a plurality of strengthening elements extending between an external wall of the second part and said one end of the first part. The size and amount of material required to form the pole mount may therefore be minimized while maintaining strength in the socket body.

In an embodiment, the attachment element comprises a collar which extends around at least part of the first part of the socket body. In an embodiment, the attachment element comprises a collar which extends fully around the first part of the socket body. An attachment element is therefore provided which may be located close against an external surface of the wall of the speaker cabinet through which the socket body is located.

In an embodiment, the internal wall of the first socket part has a plurality of elongate channels formed therein. The presence of the channels creates air gaps so that suction does not make it difficult to remove a pole from the pole mount.

Embodiments of the invention will now be described, by way of example only, with reference to the accompanying drawings.

DETAILED DESCRIPTION OF THE PREFERRED EMBODIMENTS

Figure 1:
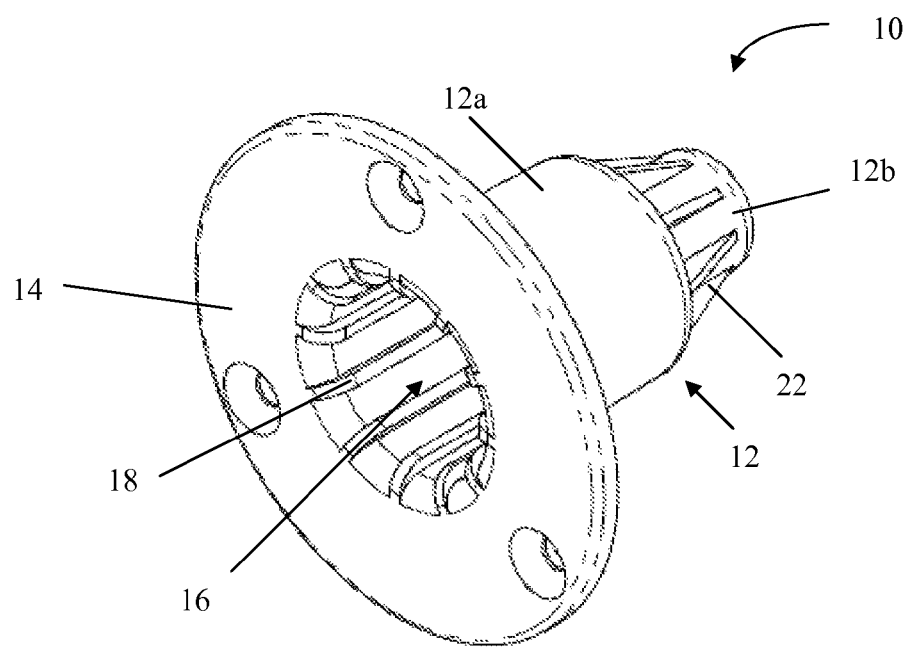
FIG. 1 is perspective front view of a speaker cabinet pole mount according to a first embodiment of the invention.
Figure 2:
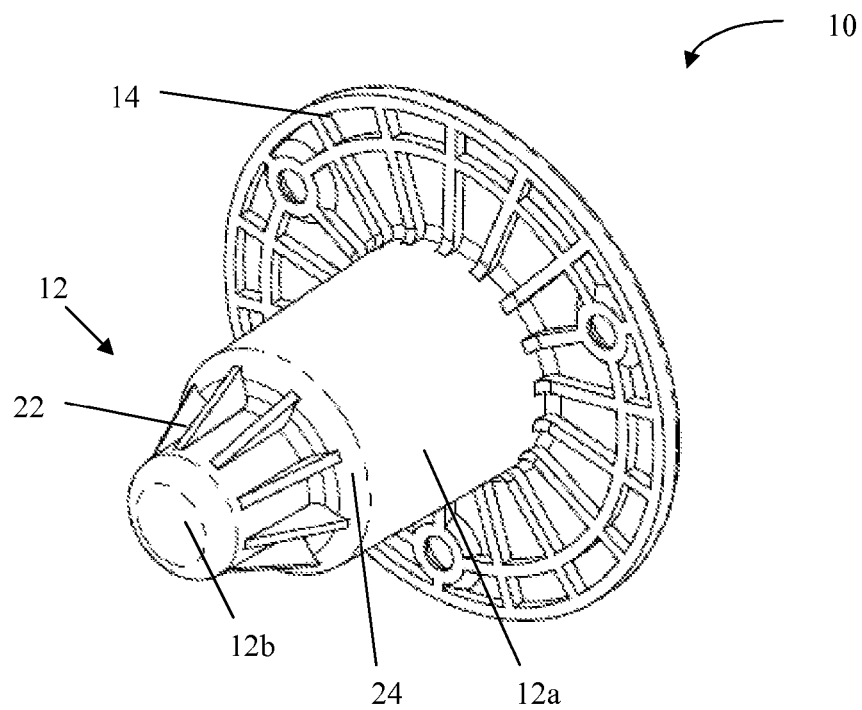
FIG. 2 is a perspective rear view of the speaker cabinet pole mount of FIG. 1.
Figure 3:
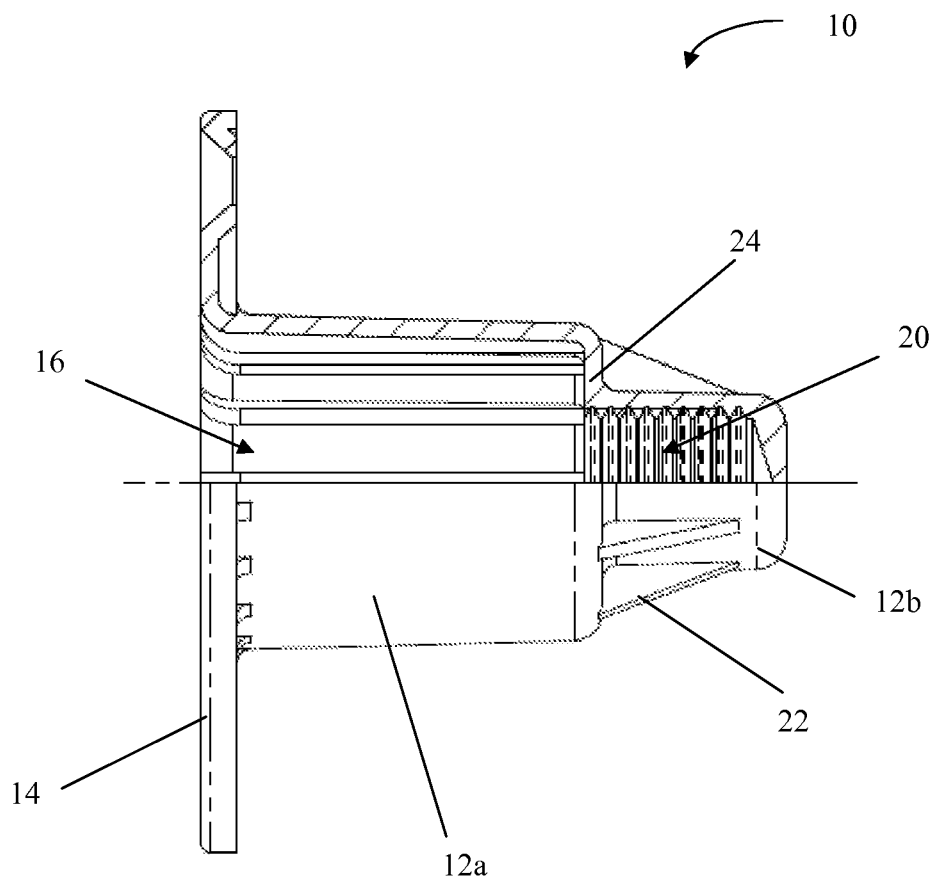
FIG. 3 is a part-sectional view of the speaker cabinet pole mount of FIG. 1.

A first embodiment of the invention provides a speaker cabinet pole mount 10 as shown in FIGS. 1 to 3. The speaker cabinet pole mount 10 comprises a socket body 12 and an attachment element 14.

The socket body 12 comprises a first part 12a and a second part 12b. The first part 12a of the socket body has a generally cylindrical shape and defines a first socket part 16. The first socket part 16 has a first diameter. The internal wall of the first part of the socket body 12a, and therefore of the first socket part 16, is unthreaded. In this example, the internal wall has a number of elongate channels 18 formed in it. The presence of the channels creates air gaps so that suction does not make it difficult to remove an end of a speaker mount pole (not shown) from the pole mount 10.

The second part 12b of the socket body extends from one end of the first part 12a of the socket body, so that the second part 20 of the pole socket extends generally from one end of the first part 16 of the pole socket. The second part 12b of the socket body is connected to the first part 12a via an end part 24, which internally defines a shoulder at the said one end of the first socket part 16.

The second part 12b of the socket body also has a generally cylindrical shape, having a smaller diameter than the first part 12a. The second part of the socket body defines the second part 20 of the pole socket. As can be seen from the drawings, the second part 12b of the socket body has a smaller external diameter and therefore defines the second socket part 20 having a smaller diameter than the first socket part 16. The internal wall of the second part 12b of the socket body, and thus of the second socket part, is provided with a coupling element adapted to engage with a threaded pole. In this example, the coupling element comprises a screw thread.

The speaker cabinet pole mount 10 also comprises a plurality of strengthening elements 22 which each extend between an external wall of the second part 12b of the socket body and the end 24 of the first part 12a of the socket body.

The attachment element 14 comprises the generally annular disc-shaped collar which is coupled to the other end of the first part 12a of the socket body. The collar 14 extends all the way round the first part 12a of the socket body and therefore encompasses the open end of the first socket part 16. Three fixing apertures are provided through the collar 14, each adapted to receive a fixing screw.

Figure 4:
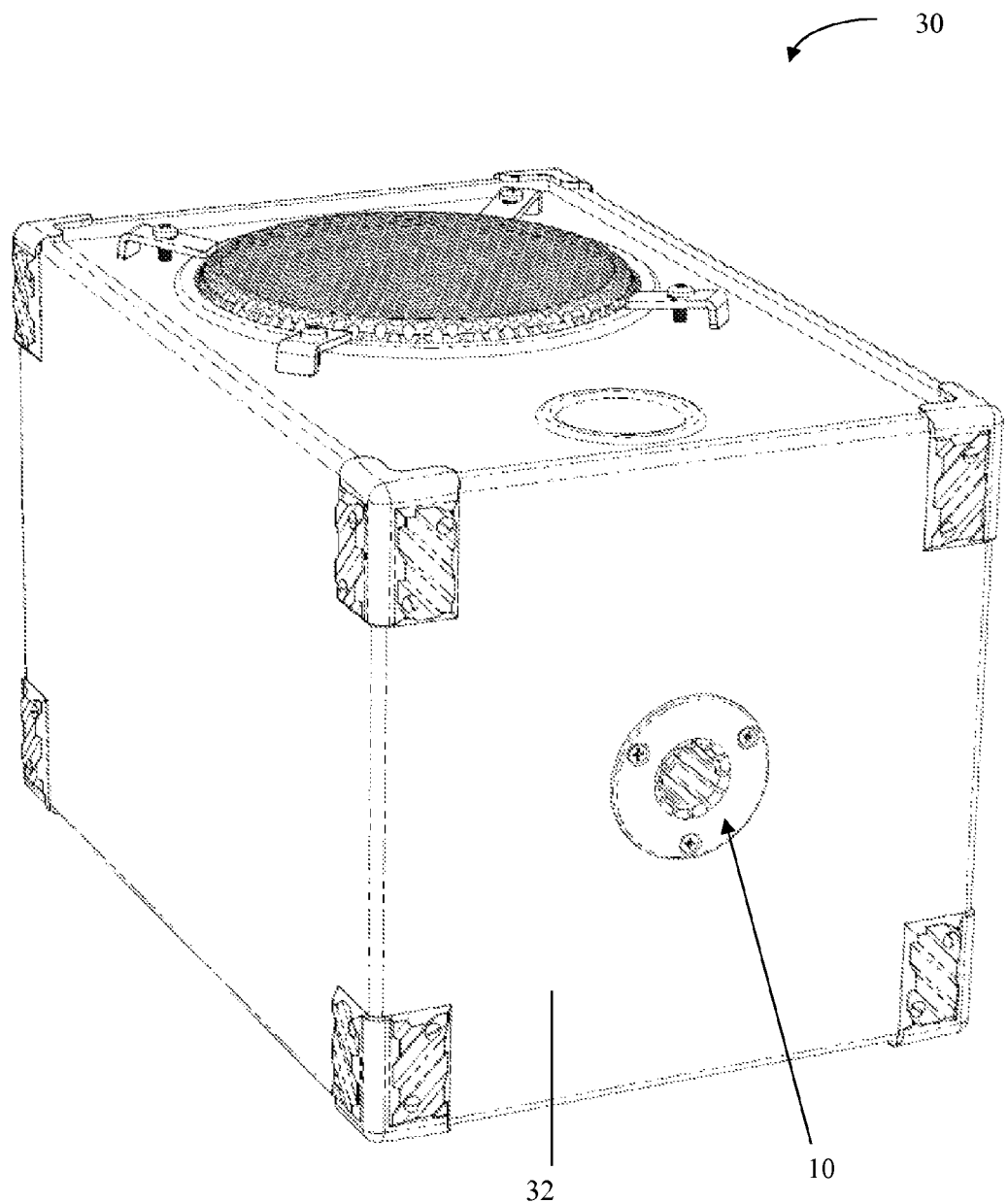
FIG. 4 shows a speaker cabinet according to a second embodiment of the invention.

In use, the socket body 12 is located through a correspondingly shaped aperture in a wall of a speaker cabinet, such as the top cabinet shown in FIG. 4. The pole mount 10 is pushed into the aperture in the speaker cabinet until the collar 14 is located adjacent the wall of the speaker cabinet. Screw fixings are then located through the fixing apertures to secure the pole mount 10 in place on the speaker cabinet.

A top cabinet provided with the pole mount 10 can then be mounted on a speaker stand having a plain pole, or alternatively a bass bin provided with the pole mount 10 can have a plain pole mounted on it, by locating the distal end of the pole into the first part 16 of the pole socket, until the end of the pole is located against the shoulder, defined by the end 24 of the end of the first socket part 12a.

A top cabinet provided with the pole mount 10 may alternatively be mounted on a speaker stand having a threaded pole, or a bass bin provided with the pole mount 10 may have a threaded pole mounted on it. Threaded poles typically comprise a plain pole and an externally threaded stud of a smaller diameter than the plain pole, which is push-fit located into the end of the plain pole. The threaded rod of the pole is located through the first socket part 16 and into the second socket part 20, and rotating the pole to engage the thread on the threaded rod with the thread on the second socket part 20. The end of the plain pole part of the threaded pole is therefore received in the first socket part 16 of the pole mount 10 and the threaded rod is screw-located into the second socket part 20.

A second embodiment of the invention comprises a speaker cabinet 30 as shown in FIG. 4. The speaker cabinet 30 in this example is a top cabinet and has a speaker cabinet pole mount 10 provided in its bottom wall 32.

The speaker cabinet pole mount 10 is arranged so that the socket body 12 extends internally into the speaker cabinet 30, with the mounting collar 14 located against the bottom wall 32 of the speaker cabinet.

The speaker cabinet 30 may alternatively be a bass bin and have a speaker cabinet pole mount 10 provided in its top wall.

There have been described and illustrated herein several embodiments of a speaker cabinet pole mount. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

The invention claimed is:

1. A speaker cabinet pole mount comprising:
   a socket body defining an opening leading to a pole socket comprising a first socket part and a second socket part extending generally from one end of the first socket part opposite the opening, the first socket part having an unthreaded internal wall of generally cylindrical shape with a cross section of a substantially uniform first internal diameter that terminates at a shoulder at the one end of the first socket part, and the second socket part having an internal wall of a second internal diameter smaller than the first internal diameter, wherein the unthreaded internal wall of the first socket part is configured to engage with a distal end of an unthreaded pole received by the first socket part and disposed adjacent the shoulder of the first socket part, and wherein the internal wall of the second socket part has an internal thread that is configured to engage with a distal end of a threaded pole received without engagement through the first socket part and into the second socket part; and
   an attachment element coupled to the socket body generally at the other end of the first socket part, the attachment element being adapted for connection to a wall of a speaker cabinet.

2. A speaker cabinet pole mount as claimed in claim 1, wherein:
   at least part of the internal wall of the second socket part is provided with an internal thread.

3. A speaker cabinet pole mount as claimed in claim 1, wherein:
   the internal wall of the first socket part has a plurality of elongate channels formed therein.

4. A speaker cabinet pole mount as claimed in claim 1, wherein:
   the second socket part has a generally cylindrical shape.

5. A speaker cabinet pole mount as claimed in claim 1, wherein:
   the attachment element comprises a collar which extends around at least part of the first socket part.

6. A speaker cabinet pole mount as claimed in claim 1, wherein:
   the first socket part has a first external diameter and the second socket part has a second external diameter smaller than the first external diameter and wherein the socket body further comprises a plurality of strengthening elements extending between an external wall of the second socket part and said one end of the first socket part.

7. A speaker cabinet comprising:
   an enclosure supporting an audio speaker, wherein the enclosure includes a wall; and
   a speaker cabinet pole mount including a socket body and an attachment element, wherein the socket body defines an opening leading to a pole socket comprising a first socket part and a second socket part extending generally from one end of the first socket part opposite the opening, the first socket part having an unthreaded internal wall of generally cylindrical shape with a cross section of a substantially uniform first internal diameter that terminates at a shoulder at the one end of the first socket part, and the second socket part having an internal wall of a second internal diameter smaller than the first internal diameter, wherein the unthreaded internal wall of the first socket part is configured to engage with a distal end of an unthreaded pole received by the first socket part and disposed adjacent the shoulder of the first socket part, and wherein the internal wall of the second socket part has an internal thread that is configured to engage with a distal end of a threaded pole received without engagement through the first socket part and into the second socket part, and wherein the attachment element is coupled to the socket body generally at the other end of the first socket part, the attachment element being adapted for connection to the wall of the enclosure.

\* \* \* \* \*